Oct. 25, 1949.  M. BONNET  2,485,811
PHOTOGRAPHY IN RELIEF
Filed Nov. 19, 1945  4 Sheets-Sheet 1
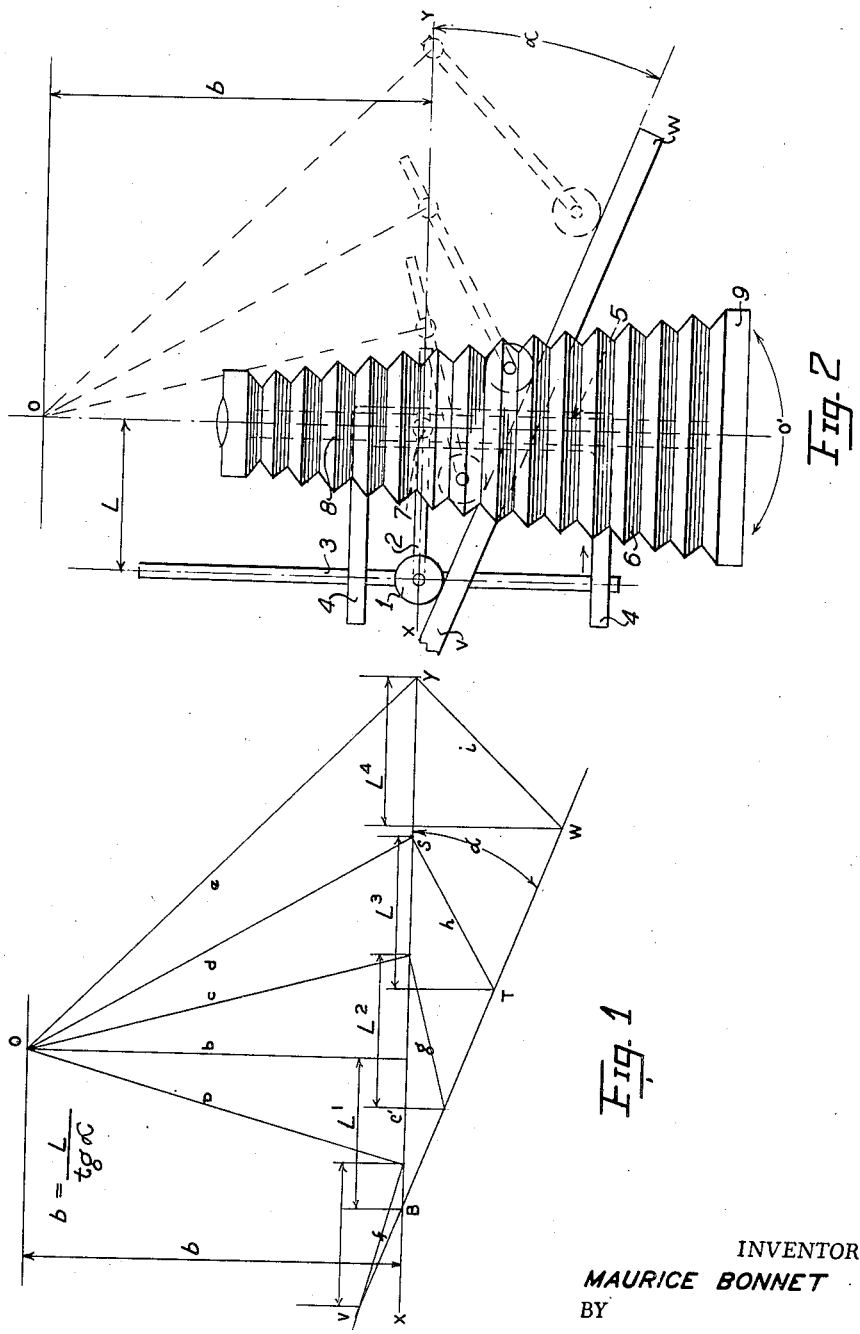
INVENTOR.
MAURICE BONNET
BY
Haseltine Lake & Co.
AGENTS Oct. 25, 1949.  M. BONNET  2,485,811
PHOTOGRAPHY IN RELIEF
Filed Nov. 19, 1945  4 Sheets-Sheet 2

INVENTOR.
MAURICE BONNET
BY
Haseltine Lake & Co
AGENTS

Oct. 25, 1949.    M. BONNET    2,485,811
PHOTOGRAPHY IN RELIEF
Filed Nov. 19, 1945    4 Sheets-Sheet 3

INVENTOR.
MAURICE BONNET
BY
Haseltine Lake & Co
AGENTS

Oct. 25, 1949.    M. BONNET    2,485,811
PHOTOGRAPHY IN RELIEF
Filed Nov. 19, 1945    4 Sheets-Sheet 4
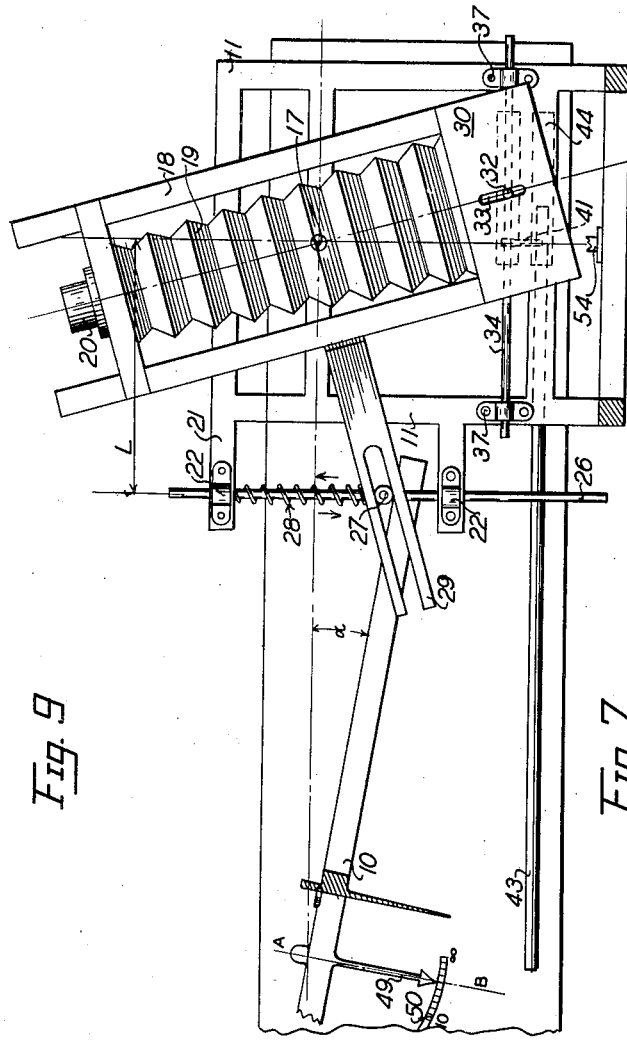
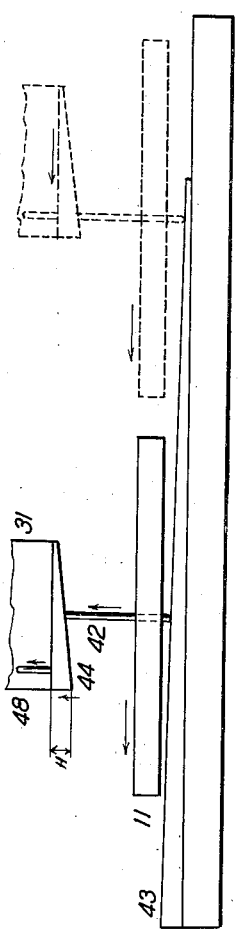
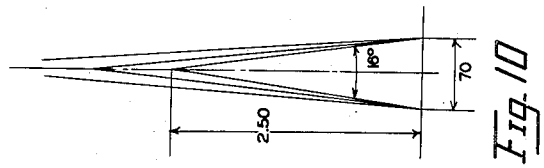
INVENTOR.
MAURICE BONNET
BY
Haseltine Lake & Co.
AGENTS Patented Oct. 25, 1949

2,485,811

UNITED STATES PATENT OFFICE 2,485,811

PHOTOGRAPHY IN RELIEF

Maurice Bonnet, Paris, France, assignor to La Reliephographie, Societe pour l'Exploitation des Procedes de Photographie en Relief Maurice Bonnet, Paris, France, a corporation of France Application November 19, 1945, Serial No. 629,483
In France November 17, 1944

Section 1, Public Law 690, August 8, 1946
Patent expires November 17, 1964

15 Claims. (Cl. 95—18)

The present invention relates to apparatus for taking peri-stereoscopic views, capable of being easily regulated by the operator himself, in such a way as to aim it at will upon points situated at different distances from the camera, including points at an infinite distance.

Such apparatus always comprises in a known manner a table upon which a photographic camera having a single lens is transversely displaceable, a sensitized surface being placed in the rear portion of the body of the camera, this sensitized surface being preceded by a selectograph or optical view-taking selector.

The invention consists essentially in the novel application to photographic cameras of variable focus of the properties of a geometrical construction.

The objects of the invention and the invention itself will be better understood from a consideration of the description given below of some of the embodiments thereof and from the accompanying drawings in which:

Figure 1 shows a geometrical construction explaining the principle of the invention;

Figure 2 shows diagrammatically a first practical embodiment of the invention;

Figures 6 and 7 show in side elevation and in plan respectively a second form of construction of the invention;

Figure 8:
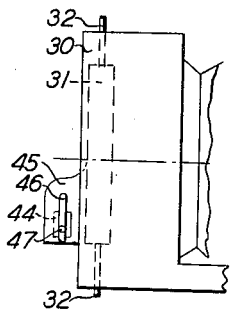
Figure 11:
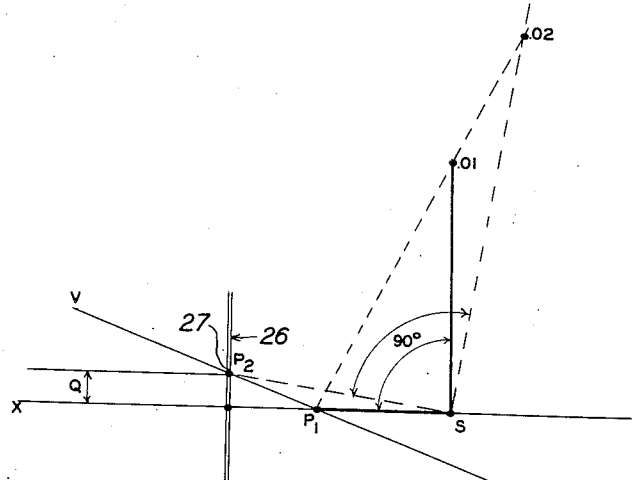

Figures 8 and 9 relate to details thereof;

Figure 10 is a diagram relating to this form;

Figure 11 is a diagram illustrating the operation; and

Figure 12:
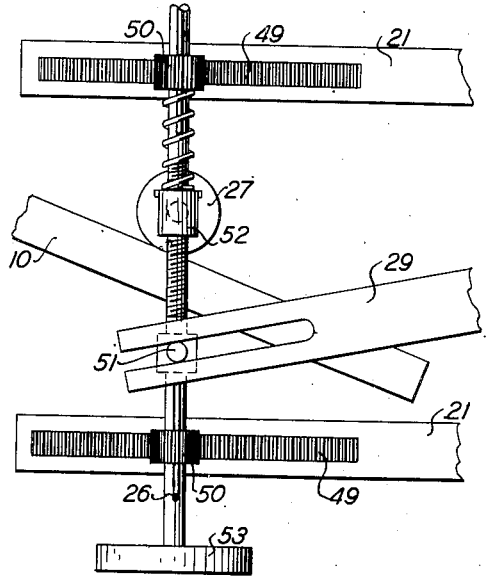

Figure 12 shows the embodiment of this diagram in the apparatus.

In the geometrical construction shown in Figure 1, let $a, b, c, d, e, \ldots$ be straight lines joining a common point O to a straight line $xy$, the straight line $b$ for example being perpendicular to this line; and let $f, g, h, i, \ldots$ be straight lines drawn perpendicular to the straight lines $a, c, d, e, \ldots$ from the points at which these straight line meet the line $xy$. Now let $L^1, L^2, \ldots$ be segments of constant length taken upon the line $xy$, starting from these latter points.

If through the end of each of the segments $L^2$, $L^3, \ldots$ a line is drawn perpendicular to the line $xy$, the points at which these perpendiculars meet the straight lines $g, h, i$ all fall in a straight line VW, which intersects the line $xy$ at a point B coinciding with the end of the segment $L'$. The straight line VW makes an angle $\alpha$ (alpha) with the straight line $xy$.

Upon comparing the similar triangles, it will be observed that there exists the relationship $$b = \frac{L}{\tan \alpha}$$

from which it follows that the value of $b$ increases if the length L increases, and also that $b$ diminishes when the angle $\alpha$ increases.

According to this invention the geometrical properties of the construction drawn in Figure 1 are applied in the first place in a general way to the construction of a directional device for a photographic camera movable upon a rectilinear transverse path, this device being adapted to ensure the constant focussing of the camera upon a fixed point, in the course of its travel.

The invention also relates, while still being based upon the properties of the geometrical construction in question, to the construction of apparatus for taking photographs in relief, enabling views to be taken at distances which can be varied at will and which can easily be regulated by the operator.

In order to permit of this variation of the distance at which the point of intersection of the successive focussing axes of the camera during its registration travel is situated, these cameras admit of comprising, according to the invention, either a member the position of which can be regulated and the action of which corresponds to a variation in the length of the segment L, or an adjustable directional member the action of which corresponds to the inclination of the line VW, for a camera which is transversely displaceable along a rectilinear path corresponding to the straight line $xy$.

Figure 2 shows very diagrammatically, and without regard to the proportions between the various members represented, in what manner, according to the invention, the first practical embodiment of the device is obtained from the theoretical construction in Figure 1.

The straight line VW is embodied in a rectilinear ramp, upon which rolls a roller 1. This roller is virtually integral both with an arm 2 and with a guiding rod 3, which slides in the branches 4 of a carriage 5 carrying the photographic camera 6 properly.

The arm 2 slides freely in a cheek or trunion 7, which pivots about a vertical axis passing through the optical axis O—O'. The photographic camera 6, through the medium of its frame 8, is virtually integral, so far as rotation is concerned, with the optical axis O—O'. The distance between the rod 3 and the pivot 7 is made equal to the length L of the segments $L^1$ and $L^2$ in Figure 1.

When the carriage 5 is displaced along a rectilinear path perpendicular to the rod 3, for instance in the direction indicated by the arrows, the trunnion 7 is itself displaced along a straight line which corresponds to the line $xy$ of Figure 1.

The parts are so arranged that the arm 2 coincides with the straight line $xy$ when the optical axis O—O' of the chamber 6 is perpendicular to this straight line. The focussing of the lens of this camera is effected in such a way that its plane of clearness coincides with the point O, situated at a distance from the trunnion 7 corresponding to the length of the straight line $b$ in Fig. 1.

The geometrical conditions of Figure 1 being thus reconstituted, when the carriage 5 is displaced in the direction of the arrows, the roller 1, which always remains pressed against the ramp VW, imposed upon the camera 6, through the agency of the trunnion 7 and the frame 8, such a movement of rotation that the optical axis O—O', of the camera always passes through the point O.

Figure 2 shows in dot-and-dash lines the successive positions taken up by the trunnion 7, the arm 2 and the focal axis of the camera, this position corresponding to various positions of the carriage 5 along its path. The position of the roller 1 being fixed upon the rod 3, the length of the arm 2 progressively increases during the displacement of the carriage 5, starting from its central position, so as to correspond successively to the straight lines $g, h, i, \ldots$ in Figure 1. In doing this, the distances between the trunnion 7 and the sighted point O assume successively the values corresponding to the lengths of the straight lines $b, c, d, e$, in Figure 1, and the camera keeps constantly its optical axis in focus in the course of its transverse path parallel to the line $xy$.

It is quite evident that in practice the distance $b$ is much greater than that represented, proportionately to the path traversed by the carriage 5, and that the obliquity of the extreme focussing axes is therefore itself much smaller. Under these conditions the difference in length between the line $b$ and the line $c$ for example becomes practically negligible, and consequently the focus remains practically constant.

The diagrammatic device that has just been described corresponds only to a camera for taking photographs in relief at a fixed focal distance. As has been shown above, the variation in the distance at which a view is taken can be very easily obtained according to the invention either by modifying the distance L or by modifying the angle of inclination $\alpha$ of the rectilinear guiding ramp for the roller.

Figure 3:
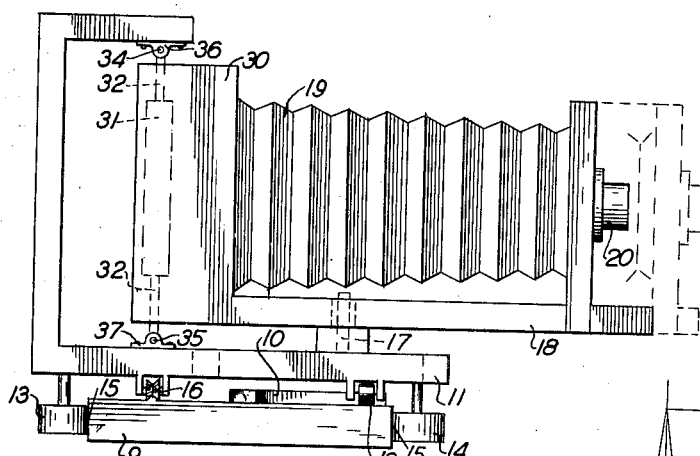
Figures 3 and 4 show in side elevation and in plan respectively one form of construction of the invention.
Figure 5:
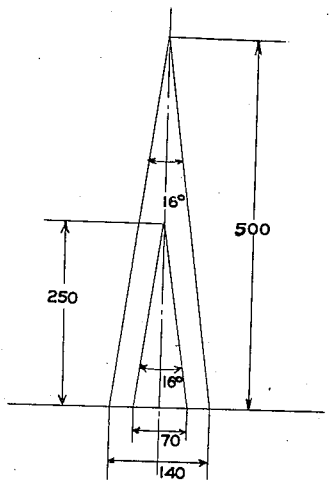
Figure 5 is a diagram relating to this form.
Figure 4:
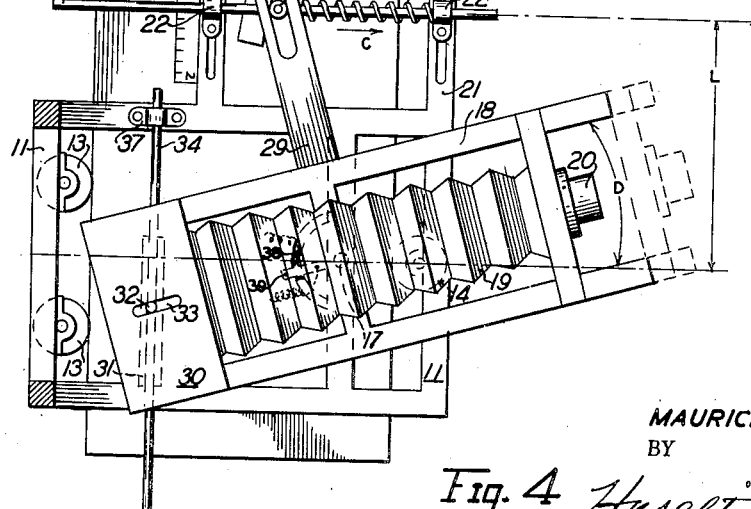

Some embodiments of the invention are diagrammatically illustrated in Figures 3 to 12 of which Figures 3, 4 and 5 relate to a first practical embodiment, greatly simplified, of a camera for taking photographs in relief according to the invention, in which the sighting distance is regulated by varying the length L. This apparatus is diagrammatically represented in profile in Figure 3, and in plan in Figure 4.

Upon the upper face of a guiding table 9 is formed or attached a rectilinear guiding ramp 10. The carriage 11 rolls upon the table 9 by means of rollers 12, represented only in Figure 3. It is guided in such a manner as to move along a perfectly rectilinear path along this table, by means of other rollers 13 and 14, represented only in dot-and-dash lines in this figure, and rolling upon the longitudinal edges 15 of the table 9. These latter rollers may be replaced by any other appropriate guiding device, for instance a rolling track with oblique walls, such as that denoted by 16 in Figure 3, upon which there roll rollers having a groove of corresponding profile.

The carriage 11 carries a trunnion 17, upon which is mounted the underframe 18 of the camera 19, the lens of which is denoted by 20. This carriage is also provided with two lateral arms 21 upon which are slidably mounted bearings 22. The device for controlling these bearings, diagrammatically represented in the figure in the form of a simple slit 23 in which are engaged their fixing bolts, is preferably constructed in practice in such a way as to permit readily their simultaneous transverse displacement, for instance a screw and nut device or a rack and pinion device. This movable unit comprises an indicating device, such as a pointer 24, moving in front of a scale 25, graduated directly in focal distances, since, as has been explained above, the point of intersection of the successive optical axes of the camera, in the course of its transverse path, varies with the distance between the trunnion 17 and the rod 26, which slides in the bearings 22, this distance being equal to L.

The rod 26 carries a roller 27, which is kept pressed by a spring 28 against the ramp 10, thus pushing the rod and the roller in the direction indicated by the arrow A in Figure 4.

Upon the underframe 18 is rigidly fixed a fork 29 perpendicular to the optical axis of the camera. This fork 29 is engaged over a tenon, which, for simplicity of drawing, is merged in the roller 27. There would of course be nothing to prevent the tenon occupying upon the rod a position different from that of the roller, for instance by choosing for the ramp 10 a different location upon the height of the table 9.

The rear body 30 of the camera contains a frame 31, which receives a dark slide containing the selectograph and the photographic plate or other sensitized surface that is to receive the impression.

The frame 31 that carries the dark slide pivots in the rear body 30 by means of two trunnions 32, sliding in two actuating slots 33. These two trunnions 32 are connected to two transverse guiding rods 34 and 35, engaging in bearings 36 and 37, carried by the carriage 11. The rods 34 and 35 effect a rectilinear displacement of the carrying frame 31 parallel to itself while the camera 19 describes an arc of a circle by pivoting about the trunnion 17.

This device operates in the following manner: the camera is represented in its extreme right-hand position. If the carriage 11 is displaced towards the left upon the table 9 in the direction indicated by the arrow B in Figure 4, the roller 27, in travelling up the inclined ramp 10, will cause the rod 26 to slide in the direction indicated by the arrow C, while the tenon engaged in the fork 29 will cause the rotation of the underframe 18 of the camera in the direction indicated by the arrow D.

While the trunnions 32, actuated by the movement of the rear body 30 of the camera 19, are acting upon the carrying frame 31, which, guided by the rods 34 and 35, moves towards the left in relation to the carriage 11 parallel to itself, the tenons move at the same time in the slots 33 of the rear body 30.

In the course of the continuation of this movement of the carriage 11, the optical axis of the camera 19 will pass through the position shown in dot-and-dash lines in Figure 4 and will then take up a position in a direction perpendicular to the longitudinal axis of the table 9, when the carriage 11 has reached a position half way along its path. The fork 29 will then be horizontal in Figure 4. The continuation of the lateral movement of the carriage 11 towards the left will then occasion in inclination of the optical axis in the reverse direction, this inclination increasing until the carriage 11 reaches the left-hand end of its travel. Altogether the camera 19 will have described at the same time a rectilinear path and a pivotal movement, the combination of these two movements enabling it to be focussed upon a fixed point, which may be the nearer according as the sliding rod 26 has itself moved nearer to the trunnion 17.

It is known that the amplitude of this pivotal movement of the camera 19 should normally be equal to the angle of opening of the vertical cylindrical lenses constituting the selectograph. Consequently, and as is clearly indicated by the diagram of Figure 5, the transverse rectilinear path that the carriage 11 has to traverse should be greater when the distance at which the view is being taken is greater. For a view-taking angle of 16° for example, and a focal length adjusted for 250 cms., the path of the carriage 11 will be about 70 cms., whereas for a focal distance of 5 m. this path will be 140 cms. Thus the table 9 will have to have a minimum length corresponding to the extreme focal distance contemplated, for instance 5 m.

The automatic stoppage of the carriage 11 after it has traversed the path corresponding to the selected view-taking distance may advantageously be effected by interrupting, by means of an appropriate automatic switch, the current feeding the electric motor which is provided for the purpose of setting in rotation certain of the rollers represented.

In the embodiment contemplated by way of example, and according to a preferred form of the invention, this automatic switch is composed of a fixed contact 38 secured to the carriage 11, extending round an arc of a circle subtending an angle of 16° in the example selected, and a contact finger 39 bearing upon the contact 38, this finger being secured to the underframe 18. The automatic switch 38, 39, besides stopping the supply of electric current to the driving motor, may also control an automatic shutter of any construction, masking the lens 20 after the camera has traversed exactly the angle of registration.

The modification of the distance of the point sighted being effected by varying the length of the arm, it should be observed how it is shown in Figure 11 that a certain irregularity of the sighted axis is occasioned by this variation. If the camera is focussed for example on the point O', the roller 27 occupying for example the position P', when the camera is at the midpoint of its travel, the fact of bringing this roller to the position $P^2$ in order to focus the point $O^2$ displaces the point sighted towards the right, as shown in the figure. The focus of the sighted points $O^1 O^2$ ... is however a straight line passing through the point of intersection of the lines $xy$ and $VW$ and perpendicular to the line $VW$.

In order to remedy the maladjustment, according to a further feature of the invention the position of the roller 27 is rendered adjustable along the rod 26 thus enabling the fresh point sighted to be brought into alignment with the point previously sighted. The tenon engaged in the forked arm 29 remains of course fixed on this rod.

In the example of Figure 11, it will be sufficient to shift the roller 27 upwards by the amount Q in relation to the tenon in order to bring into alignment with the point $O^1$ the point $O^2$, to which the apparatus is now adjusted.

The control of this roller is preferably synchronised with that of the rod 26, so as to maintain automatically in the central axis of the apparatus the alignment of the points successively sighted, which are arranged stepwise in depth.

One embodiment of this synchronised control is given by way of example in Figure 12. The arms 21 carry racks 49, upon which roll pinions 50, within which the rod 26 is capable of sliding freely, while remaining virtually integral, so far as rotation is concerned, with these pinions. The tenon that drives the forked arm 29, fixed to the said rod, is denoted by the reference numeral 51. The roller 27, pressed against the ramp 10, is carried by a nut 52, engaged on a screw threaded part of the rod 26, which carries an operating knob 53.

The thread of this screw is so chosen as to displace the roller 27 automatically in relation to the tenon 51, by exactly the amount necessary in order to maintain the fixity of the central sighting axis of the apparatus.

It is quite obvious that this device is represented only very diagrammatically in Figure 12. Only the parts that are directly necessary for a correct understanding of the operation have been indicated.

It has just been explained how the camera for taking photographs in relief that has just been described effects according to the invention a path of registration exactly proportional to the view-taking distance, in such a manner as always to conserve a constant angle of registration. This condition, as we have ascertained, is indispensable in order that the relief of the photograph obtained may be correct, that is to say, in order to eliminate any anamorphosis. Thus a more restricted path of the camera would involve a diminution in the relief, that is to say, a general flattening of the selectograph, which is at least undesirable as regards bodies or persons photographed at a short distance.

It is evident however that under these conditions, and for greater view-taking distances, one would quickly be led to design travelling tables of excessive length, and it is for this reason that the apparatus that has just been described is provided for short view-taking distances, varying for example from 2 m. to 5 m. as has been indicated. This apparatus is therefore essentially designed for the equipment of studios for example, and enables images to be obtained which exhibit rigorous exactitude in the relief effect given.

Figure 6:
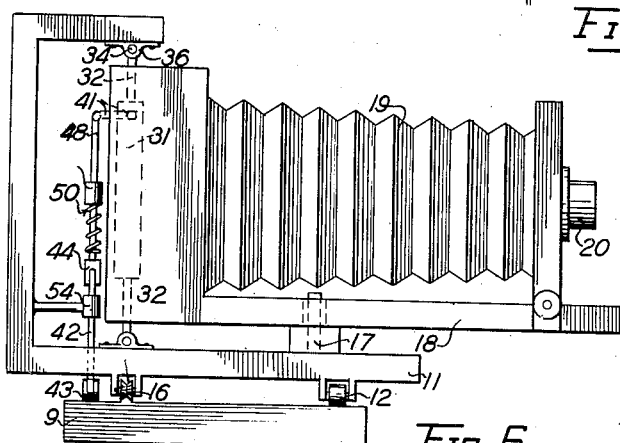

Figures 6 and 10 show a second form of construction of the invention, likewise based on the geometrical properties set forth in Figure 1. In this embodiment, the variation in the distance of the point sighted is obtained by modifying the angle α instead of by modifying the length L, and this constituted, as has been shown, a second means of operating upon the value of b in the equation set forth.

The characteristic features of this second constructional form render it more particularly suitable for taking selectographs at great distances, as in the case of out-door views, monuments, and landscapes for example.

These selectographs, if they had been taken with the apparatus previously described would necessarily present, on account of the great distance between their various planes, a practically exaggerated relief, which would express itself by a disagreeable effect of transverse mobility in relation to the successive planes. Contrary to what is the case for the apparatus described above, the transverse travel of this further apparatus remains constant whatever may be the distance of the point sighted, and the anamorphosis occasioned by this fact, which increases with the view-taking distance, remedies the defect that has just been mentioned.

In all cases, by adopting one or the other of these two forms of apparatus, it is possible to satisfy all the requirements arising in practice. Nothing however prevents the characteristics of these two forms of construction being combined in one and the same camera.

In Figures 6 to 10 the same reference numerals have been adopted to denote parts corresponding to those indicated in Figures 3 and 4.

The distance L now remaining constant, the bearings 22 occupy fixed positions on the arms of the carriage 11. The ramp 10, on the contrary, is now adjustable in inclination in order to enable the angle α to be varied. For this purpose it pivots about a central vertical axis 40. For the rest, the operation of the constant centering mechanism of the optical axis upon the point sighted in the course of the transverse displacement of the carriage 11 is absolutely identical with that of the first form of construction.

The adjustable ramp 10 is provided with a pointer 49, displaceable before a scale 50 graduated directly in view-taking distances. This ramp 10 is of course provided with some convenient device for locking the selected inclination.

The apparatus, as shown in Figure 10, is so constructed that the pivotal movement of the camera 19, when it is focussed upon the nearest point, is effected over an angle equal to the angle of opening of the lenses of the selectograph, 16° for example. In this case the selection of the images is effected normally by parallax, as in the first embodiment described.

Nevertheless the pivotal angle of the camera, and consequently the selective parallax effect, diminishes as the distance of the point sighted becomes greater. According to a further feature of the invention this apparatus is then also provided with an additional means of selection, automatically supplementing the effect of the parallax selection, to the extent to which the latter diminishes with the increase in the distance from which the view is taken.

For this purpose, the apparatus comprises an additional device for selection by slipping, by the action of which the selectograph and the sensitized surface may effect, during the transverse travel of the camera, a relative displacement or slipping in a direction perpendicular to the lenses of the selectograph, this slipping admitting of attaining an amplitude corresponding to the breadth of one lens, in which case the effect of selection by slipping is total, this total effect corresponding to the case in which the camera is focussed for infinity.

Various mechanisms effecting this slipping have already been proposed, and it is therefore unnecessary to describe one of them here. This mechanism is connected with or incorporated in the dark slide that carries the selectograph and the negative. It is actuated for example by a lever 41, shown more clearly in Figure 6.

The actuation of this lever is effected by a push rod 42, which may conveniently be guided vertically, and which bears upon an oblique rectilinear ramp 43, formed or fixed upon the table 9. The obliquity of this ramp is so selected as to occasion, between the selectograph and the sensitized surface, the slipping movement necessary for total selection, while the camera 19 and the carriage 11 as a whole traverse their constant paths upon the table 9. The height of this ramp is denoted by H in Figure 9.

According to a further feature of the invention a mechanism for correcting the selection is also provided, thanks to which the influence of the selection by slipping is automatically diminished as that of the parallax selection increases, and conversely, in such a manner as to occasion, jointly, a mixed effect which is exactly equal to the value required. This mechanism for correcting the selection is illustrated in an embodiment represented very diagrammatically by way of example in Figures 6, 7, 8 and 9 of the drawings. It is composed essentially of a ramp 44, so mounted as to be movable vertically parallel to itself, upon the carrying frame 31, through the medium for example of lateral lugs 45, as shown in Figure 8. These lugs each comprise a guide 46, in which engages a lateral tenon 47 of the movable ramp 44. Of course this diagrammatic device may be supplemented if necessary by any mechanical means obviating the jamming of the ramp 44 in its guides.

The total height H of the ramp 44 is equal to that of the ramp 43, and its obliquity is inverse. The length of this ramp is moreover equal to the maximum travel that the carrying frame 31 is capable of effecting in relation to the carriage 11, inside the rear body 30, when the camera 19 is focussed upon the nearest point compatible with the construction of the apparatus.

Upon the upper horizontal face of the ramp 44 is resiliently applied, under the action of a spring 50, a push member 48 conveniently guided in a lateral bearing 49 on the carrying frame 31. The push member 42 is itself guided in a bearing 54, as well as in a transverse member of the carriage 11.

This selection-correcting device operates in the following manner: the left-hand part of Figure 9 shows the relative positions of the carriage 11 and of the ramp 44 when the camera is focussed on infinity. The push member 42 then bears upon the central portion of the ramp 44. As no rotational movement of the camera 19 about the trunnions 17 is taking place, the ramp 44 does not effect any transverse displacement, and the vertical travel imposed on the push member 42 by the ramp 43, in the course of the travel of the carriage 11 towards the left, is wholly transmitted to the push member 48, through the medium of the ramp 44 which rises to a corresponding extent in its guides 45, 46. The selection by slipping is then complete.

If the camera 19, on the contrary, is focussed upon the nearest point, by pivoting about the axis 17 during the travel of the carriage 11 towards the left, a relative transverse movement is occasioned between the ramp 44 on the one hand and the push member 42 on the other hand, this movement being equal in this case to the whole of the useful length of the ramp 44. Under these conditions, the elevation stroke of the push member 42 will no longer be transmitted to the push member 48. In point of fact, at each point of the travel the elevation course of the push member 42 will be counterbalanced by an equal reduction in the thickness of the ramp 44 interposed between the two push members 42 and 48. The arm 41 will then not be actuated, and the mechanism for selection by slipping will remain inoperative, the selection being effected solely by parallax.

It will be realised that for sighting points intermediate between the minimum distance provided for an infinity, the transverse displacement of the ramp 44 will only be partial, the travel imposed on the push member 48 thus being limited, in each case, to the value necessary in order that the effect of selection by slipping may merely supplement that of the parallax selection.

It will be understood that the device described, which constitutes essentially a deformable triangular system, presents the following main advantages:

(a) From the constructional point of view it comprises only rectilinear guiding means, which are therefore easy to manufacture;

(b) From the practical point of view it enables selectograph photographs to be taken at any distance, the adjustment of the sighting distance being obtained by operating a single member in front of a graduated scale;

(c) Finally it renders it possible to obtain either an exactly proportional relief, or on the other hand an attenuated or an exaggerated relief, according to the requirements of the subjects photographed.

Having now particularly described and ascertained the nature of my said invention, and in what manner the same is to be performed, I declare that what I claim is:

1. In a continuous recording apparatus for photography in relief, adapted for use over varying distances and comprising a support for the apparatus, a photographic camera having a lenticular selecting screen or network associated therewith, and means for pivoting said camera about a vertical axis, and a movable carriage mounted for displacement perpendicular to a predetermined right line joining the apparatus and the subject to be photographed, said camera being supported on said carriage, and rectilinear guides connected to the apparatus support for controlling the movement of said carriage, a horizontal control arm connected at its one end to said carriage in fixed angular relation to the camera, said arm having its axis passing through the vertical pivoting axis of said camera and being disposed perpendicularly to the optical axis thereof, a roller having a support mechanically connected to said arm at its other end and said arm being slidable along its axis through one of its end connections, a ramp oblique to said guides connected to the apparatus support, and means constantly applying said roller against said ramp as the camera is displaced, whereby said camera, in all positions of said carriage, is continuously aimed at the subject to be photographed.

2. Apparatus for photography in relief according to claim 1, wherein the connection of the control arm at its said one end and the carriage includes a pivoted trunnion through which said arm is slidable.

3. Apparatus for photography in relief according to claim 1, wherein the amount for the mechanical connection between the arm and the roller comprises an axial slot in said arm.

4. Apparatus for photography in relief according to claim 1, wherein a rod perpendicular to the rectilinear path of the camera is mounted on said carriage, to slide thereon along its own axis, said rod being jointed to said horizontal arm, at one end of the effective length of the latter, by the said roller support.

5. Apparatus for photography in relief according to claim 4, including a tenon rigid with said rod, for causing said camera and arm to pivot on said carriage, said arm being rigidly fixed perpendicularly to said camera at one end thereof and being forked at the other end thereof to form a slideway for said tenon.

6. Apparatus for photography in relief according to claim 4, including means for laterally displacing said rod and maintaining it parallel to itself, the lateral displacement thereof corresponding to variations of the sighting distance of the camera.

7. Apparatus for photography in relief according to claim 6, wherein said means includes a scale graduated in view-taking distances and a pointer co-operating with said scale, mounted to be relatively movable responsive to displacement of said rod.

8. Apparatus for photography in relief according to claim 6, said rod having a central threaded portion, a nut movable upon said threaded portion, a pinion at each end of said rod, a rack co-operating with each of said pinions, said racks being parallel to said rectilinear path, a connection between said nut and roller, and means for rotating said rod and pinions, whereby the optical axis of said camera is constantly trained on the object sighted at all distances.

9. Apparatus for photography in relief according to claim 1, including means for rotating said guiding ramp about a vertical axis, from a position parallel to said rectinlinear path, corresponding to focussing said camera on infinity, to a position of extreme obliquity corresponding to focussing said camera on the nearest point compatible with the construction of the apparatus, whereby the distance from the camera to the sighted object may be varied.

10. Apparatus for photography in relief according to claim 1, including means for moving said carriage along said path a distance proportional to the focussing distance of said camera, whereby said camera is given at all focussing distances, a constant view-taking angle, equal to the aperture of the lenticular elements of the selecting network.

11. Apparatus for photography in relief according to claim 1, said camera including a vertical carrying frame in the rear part thereof, said frame having an upper and a lower vertical central tenon, the body of said camera being axially slotted to allow passage of said tenons, said carriage having an upper and a lower rod slidably mounted thereon parallel to said rectilinear path, said upper and lower rods engaging the extremities of said central tenons, whereby said frame is maintained constantly parallel to itself during the rotation of the camera.

12. Apparatus for photography in relief according to claim 1, including an electric motor for driving said carriage along its path, said carriage being provided with an automatic end-of-travel switch controlling said motor, said switch comprising an arcuate contact carried by said carriage and a co-operating contact carried by the camera frame between the ends of said arcuate contact, whereby the distance traversed by said carriage is constant for all view-taking distances.

13. Apparatus for photography in relief according to claim 1, including supplementary selecting means for correcting for the decrease of parallax selection in accordance with the increase of the distance of the sighted object.

14. In an apparatus for photography in relief according to claim 13, a selecting device comprising a sliding selector, a fixed rectilinear ramp secured to the support of the apparatus and parallel to the axis thereof, and a mechanical connection between said ramp and selector, whereby said selector is actuated under the control said ramp correspondingly to the total selection effect.

15. In a continuous recording apparatus for photography in relief, adapted for use over varying distances and comprising a support for the apparatus, a photographic camera having a lenticular selecting screen or network associated therewith, and means for pivoting said camera about a vertical axis, and a movable carriage mounted for displacement perpendicular to a predetermined right line joining the apparatus and the subject to be photographed, said camera being supported on said carriage, and rectilinear guiding means on the apparatus support for controlling the displacement movement of said carriage, a horizontal control arm connected at its one end to said carriage in fixed angular relation about the pivoting axis of the camera, said arm having its axis passing through the vertical pivoting axis of said camera and being disposed perpendicularly to the optical axis thereof, a roller having a support mechanically coupled to said arm at the other end, and said arm being variable in length along its axis between said connections, a ramp oblique to said rectilinear guiding means on the apparatus support, and means constantly applying said roller against said ramp as the camera is displaced, said camera, in all positions of said carriage being continuously aimed at the subject to be photographed, in accordance with the relationship $$b = \frac{L}{tg\alpha}$$

in which $b$ is a predetermined effective focal distance between the camera and the subject aimed at, $L$ is a corresponding effective length of said arm, and $\alpha$ is the angle between said rectilinear guide means and said ramp.

MAURICE BONNET.

REFERENCES CITED

The following references are of record in the file of this patent:

UNITED STATES PATENTS

| Number | Name | Date |
|---|---|---|
| 2,150,932 | McDonnell | Mar. 21, 1939 |
| 2,158,660 | Kanolt | May 16, 1939 |
| 2,175,114 | Friedmann et al. | Oct. 3, 1939 |
| 2,400,455 | Donaldson | May 14, 1946 |